June 6, 1950 — R. C. DEHMEL — 2,510,385
FLIGHT TRAINING APPARATUS
Filed April 10, 1945 — 4 Sheets-Sheet 1

INVENTOR.
RICHARD C. DEHMEL.
BY
ATTORNEY

June 6, 1950     R. C. DEHMEL     2,510,385
FLIGHT TRAINING APPARATUS
Filed April 10, 1945     4 Sheets-Sheet 2

INVENTOR.
RICHARD C. DEHMEL.
BY
ATTORNEY

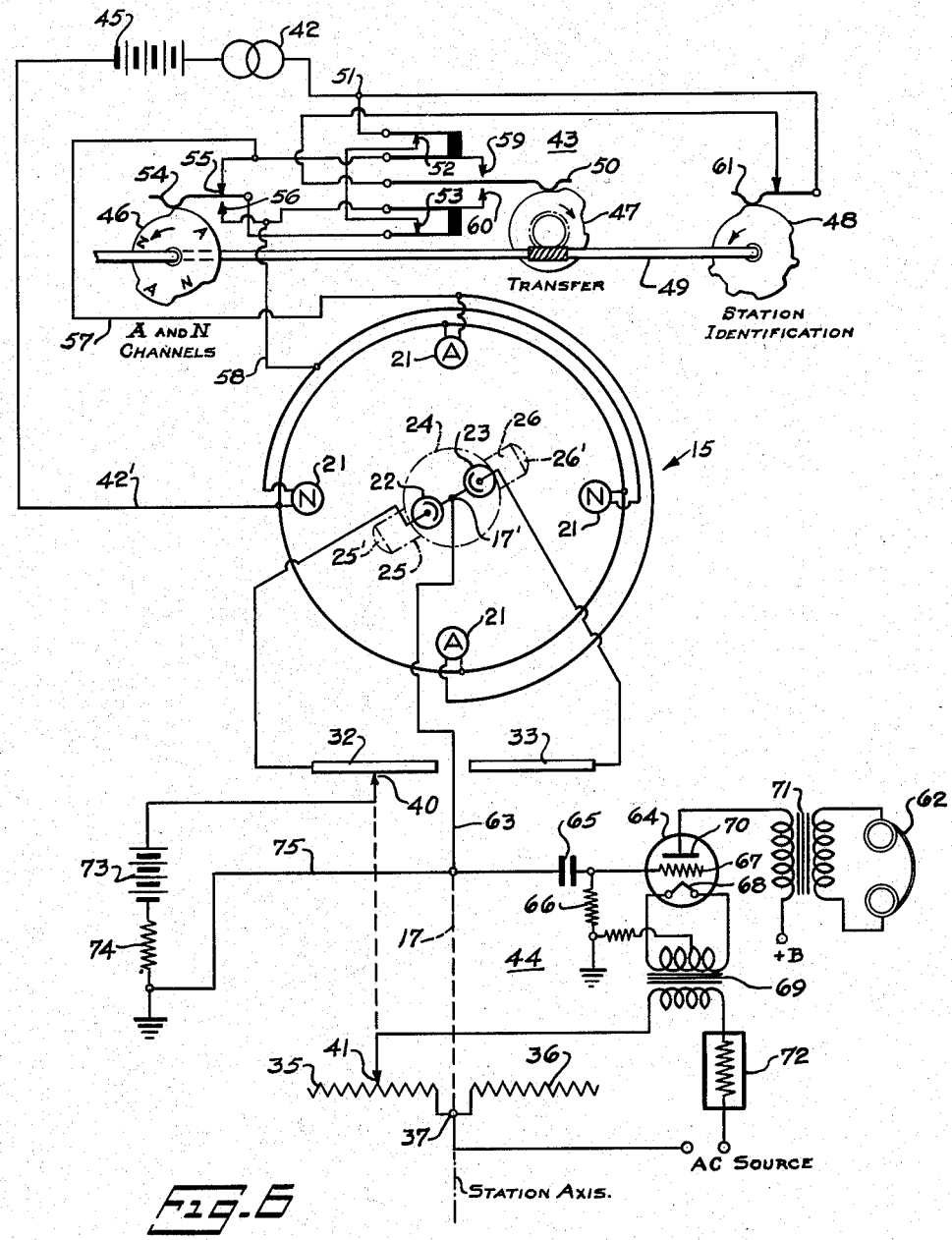

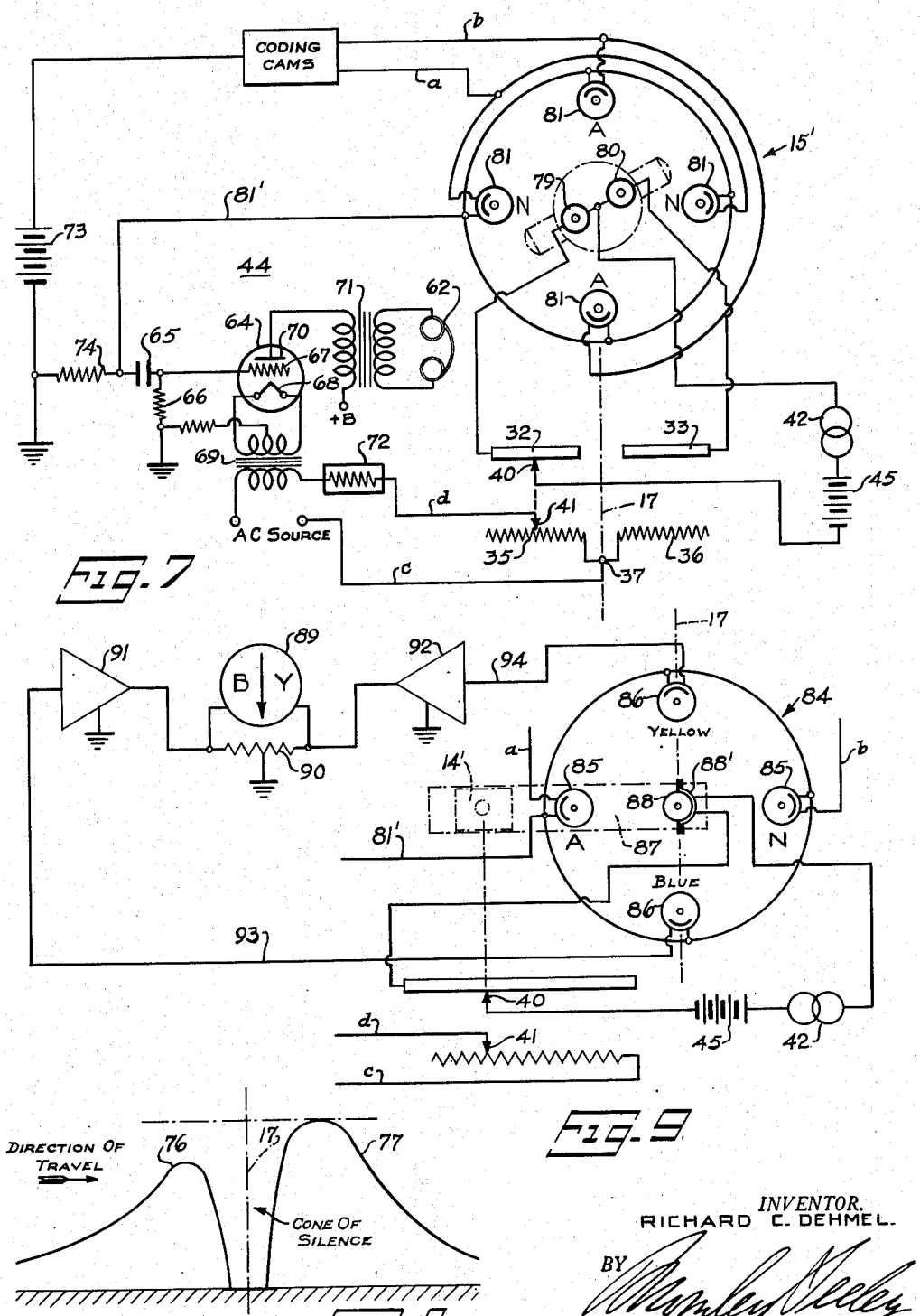

Patented June 6, 1950

2,510,385

UNITED STATES PATENT OFFICE 2,510,385

FLIGHT TRAINING APPARATUS

Richard C. Dehmel, Short Hills, N. J.

Application April 10, 1945, Serial No. 587,506

20 Claims. (Cl. 35—10.2)

This invention relates to flight training apparatus and particularly to apparatus for use in simulating radio range signals as would be received by an aircraft pilot navigating during actual flight over a radio range of any desired pattern.

Aircraft trainers of the aforesaid type have been developed for the purpose of training pilots to fly by instrument and by orientation methods involving the use of signals from a simulated multi-beam radio range station or stations. Consequently, fidelity of simulation of the range signals assumes considerable importance in the student pilot's training since fine distinctions in the intensity or rate of change in volume, or both, of the received signals convey important information to the pilot concerning his position on the radio range, and particularly when he is quite near the station.

It is also important that the character, duration and changes of the range and marker signals simulate as closely as possible the signals received under actual operating conditions so that the pilot can become quickly familiar with instrument flying and orientation procedure under conditions of actual flight.

A principal object of my invention therefore is the provision in a training device of improved signal controlling apparatus for simulating with a high degree of accuracy and fidelity the signals received in an aircraft maneuvering with respect to a station, such as the presently known multi-beam radio range station, to correspond with the instant simulated position of the aircraft.

A further object of my invention is the provision of improved translating means between apparatus responsive to change in azimuth of the simulated flight and electrical means representing the direction sectors of the radio range for producing smooth and even changes in the signal intensities.

A further object of my invention is the provision of photo-electric translating means for accurately following changes in azimuth of the simulated flight and for producing smooth and even signal tones.

A further object of my invention is the provision of electrical means for introducing into the signal receiver circuit certain resistance characteristics for simulating more accurately the rise and decay of the range and marker signals near and over the radio station.

In accordance with my invention in one disclosed embodiment thereof, photo-electric means are mounted for rotation about an axis representing the radio range station and means associated with the trainer representing the instant simulated flight position cause the photo-electric means to assume angular positions simulating azimuth. Electrical illuminating means, such as fast-follow lamps, are disposed concentrically about said axis in such manner as to represent the direction sectors of the station. Accordingly, a change in the angular position of said photo-electric means with respect to a definite sector lamp can change the degree of light activation from that lamp. The lamp circuits may include an audio-frequency oscillation modulator and coding means for the quadrant signals and the photo-electric means may be connected to an amplifier and signal receiver circuit. In an alternative form, the relative movement to represent change in azimuth is obtained by disposing photo-electric means at the direction sectors, and the lamps at the station axis. In this arrangement the lamps may be simply connected to the modulator circuit, the photo-electric means being connected to the coding and receiver circuits.

My invention will be more fully set forth in the following description referring to the accompanying drawings, and the features of novelty which characterize my invention will be pointed out with particularity in the claims annexed to and forming a part of this specification.

Referring to the drawings, Fig. 1 is a plan view of signal controlling apparatus embodying my invention;

Fig. 6 is a diagrammatical lay-out of the associated apparatus and circuits embodied in one form of my invention;

Fig. 7 is a similar view illustrating another form of my invention:

Fig. 8 is a graphical illustration of the intensity of signals received in an aircraft at and near a radio range station; and Fig. 9 is a diagrammatic illustration of another form of my invention for visual signaling.

Figure 1:
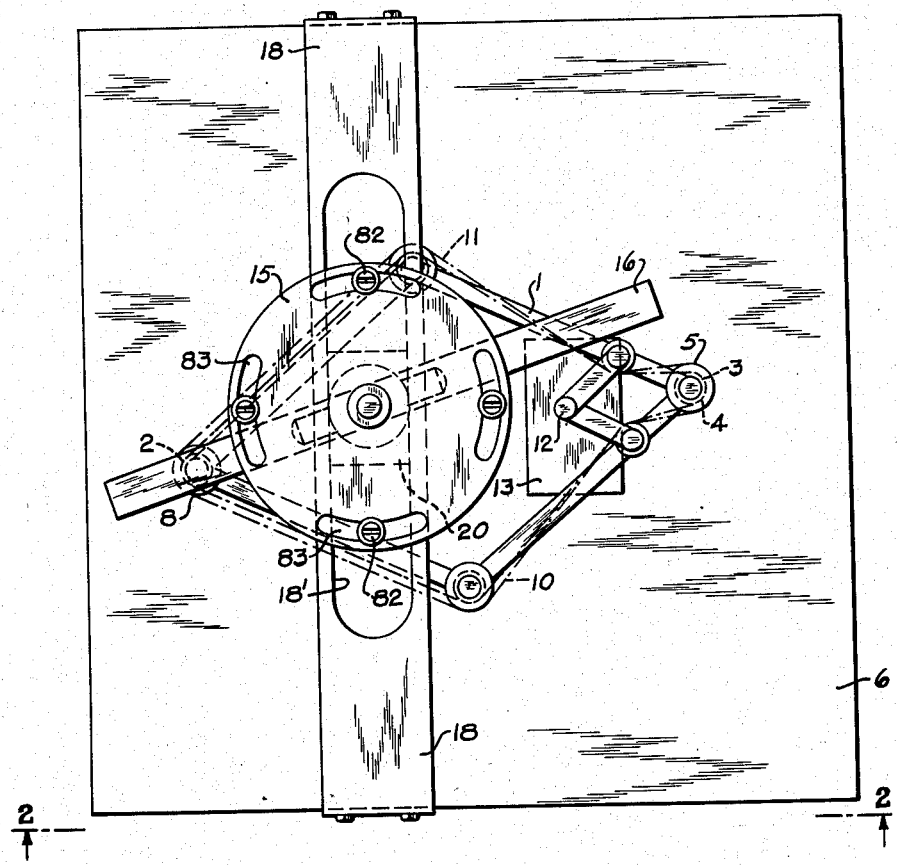
Figure 2:
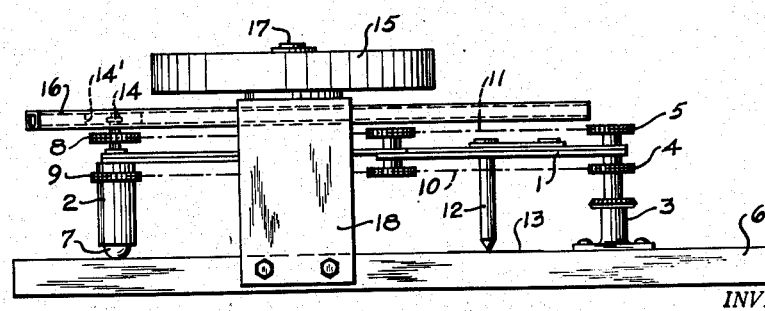
Fig. 2 is an elevational view of the apparatus shown in Fig. 1 at the line 2—2 thereof.

In my Patent 2,366,603 granted January 2, 1945, for aircraft training apparatus there is disclosed means for operating simulated aircraft controls and energizing motive means for controlling the movement of an element, such as a charting element, representing the instant flight position of an aircraft with reference to a radio range station. In Figs. 1 and 2 of the present application there is disclosed apparatus wherein a pantograph 1 is suitably operated by motive means (not shown) for controlling the position of a charting element or head 2 which represents the instant position of the simulated flight. The aforesaid motive means may be of the character disclosed in my patent above referred to. The pantograph is operated from a fixed supporting post 3 by operating shafts connected respectively to the sprocket wheels 4 and 5 and extending vertically through said post and the supporting panel 6 to motive means disposed beneath.

The free end of the pantograph is connected to the charting head 2 which is provided with a tractive wheel 7 operated from the sprocket wheel 8 in accordance with simulated aircraft velocity. The head 2 is rotated by means of the sprocket wheel 9 to control the direction thereof. The sprocket wheels 9 and 8 are connected by chains 10 and 11 as illustrated to the driving sprocket wheels 4 and 5 respectively.

For recording the simulated flight, a stylus or marker 12 can be connected to the pantograph as illustrated for making a trace on the chart 13. Further discussion of the above apparatus is unnecessary since the structure and function thereof are described in detail in my above identified patent.

For the purpose of using movement of the charting head 2 to control the radio range signal reception according to the simulated instant position of the aircraft, the head 2 is operatively connected by means of a pin 14 to a signal controller and translating device including the units 15 and 16 which are positioned for relative movement with respect to each other. In general, the function of the unit 15 is to represent the sectors of the radio range and the unit 16 to represent the instant position in azimuth of the aircraft as well as the range or distance of the aircraft from the radio range station. More specifically, the azimuth unit 16 comprises an elongated bar connected to the pantograph by the pin 14 and slider 14' and pivotally mounted about an axis 17 extending through the center of the radio range unit 15 to represent the position of the radio range station. Accordingly, as the head 2 moves along the simulated flight course the slider 14' moves along the longitudinal axis of the azimuth unit 16 to represent range distance from the station, and also laterally to swing the bar about its axis according to the change in azimuth of the simulated flight.

Figure 3:
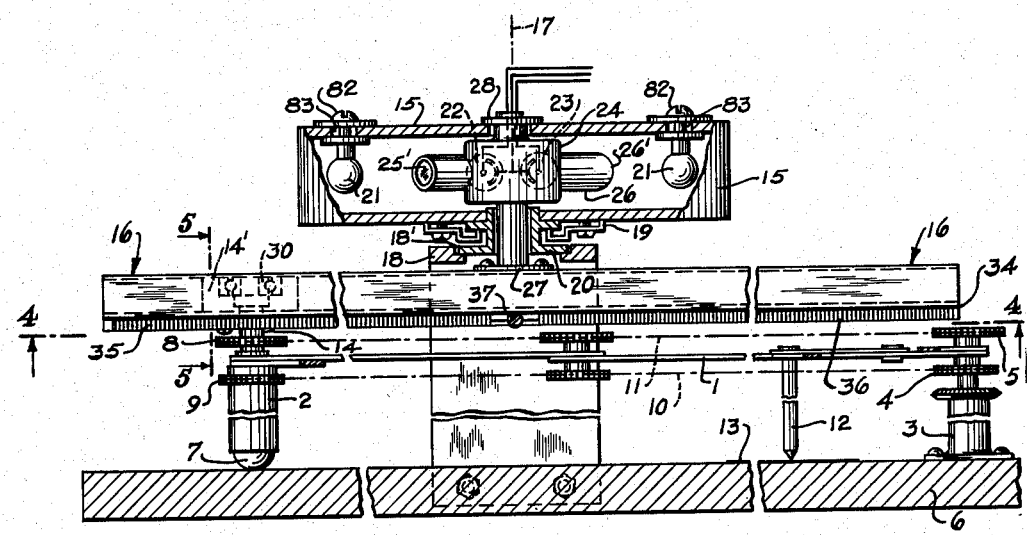
Fig. 3 is an enlarged elevational view, partly in section, of apparatus shown in Figs. 1 and 2.
Figure 4:
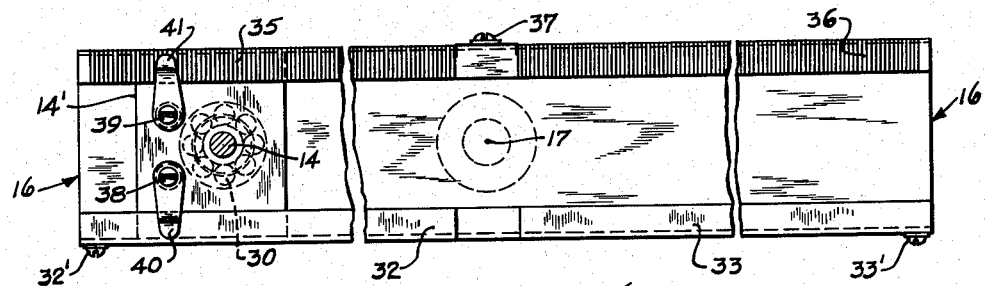
Fig. 4 is a detailed plan view of apparatus shown in Fig. 3 at the line 4—4 thereof.
Figure 5:
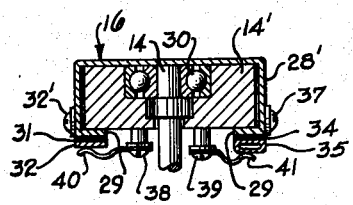
Fig. 5 is a cross-sectional view taken along the line 5—5 of Fig. 3.

The radio range unit 15 comprises a relatively fixed disk-like housing that is mounted on a bracket support 18 which bridges and is secured to opposite sides of the panel 6. The azimuth unit 16 is supported in depending relation from the unit 15 for free rotation as best illustrated by Fig. 3, and is positioned beneath the bracket 18 so that it can swing through 360° without interference from the bracket or pantograph.

Referring in particular to Figs. 3, 3a, 4 and 5, the radio range unit 15 is associated with photoelectric translating means operated in accordance with the relative angular movement between the units 15 and 16 for controlling the intensity of the simulated range signals. In a specific embodiment of my invention shown by Figs. 3 and 6, a plurality of light sources 21 such as for example, fast-follow lamps of the type using a very fine filament or neon or mercury vapor, are located concentrically around the axis 17 to represent in number and angular relation the quadrants or sectors of a radio range station.

Where the azimuth unit 16 is symmetrical with respect to the simulated station axis 17, i. e., where the unit arms extending from opposite sides of the axis are substantially equal, two photo-electric cells are arranged to rotate with the double-arm unit, one cell for each arm, and are electrically controlled so as to operate one at a time, depending on which side of the station the simulated flight position is located. However, if the single arm azimuth unit of my above identified patent is to be used in the present invention, but one photo-electric cell is necessary since the arm is swung through 180° by a follow-up servo motor arrangement when the simulated flight position reaches the central axis. The specific construction of the double-arm arrangement illustrated by Fig. 3 is as follows:

A pair of light-sensitive elements such as photo-electric cells 22 and 23 are mounted in an apertured housing 24 that is secured to and rotatable with the azimuth unit 16 and are arranged to be positioned in light-activated relation in a manner hereinafter described to the aforesaid fast-follow lamps. The photo-electric cells are positioned on opposite sides of the axis and may be 180° apart as best illustrated by Fig. 6. For the purpose of properly focusing light from the aforesaid light sources on the photo-electric cells, the cell housing 24 is provided with apertures in registry with a pair of tubular members 25 and 26 which may be radially positioned so as to be substantially opposite the cells 22 and 23 respectively. Suitable light-gathering lenses 25' and 26' at the light receiving ends of the tubes focus the light rays on the corresponding cell.

Figure 3A:
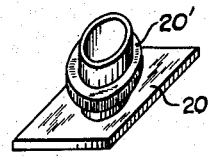
Fig. 3a is a perspective view of range unit mounting structure.

The cell housing 24 is secured to the azimuth unit 16 at 27 and constitutes an integral part thereof. This integral unit is hung for free rotation from the fixed radio range unit housing 15, as by a collar 28 secured to an upper extension of the cell housing 24, a lower extension of the housing extending freely through the unit 15 and support 18 for connection to the azimuth unit 16. The unit 15 is adjustably secured at 19 to the base support 20 which is seated in an elongated slot 18' (Fig. 1) in the bracket 18 for lateral adjustment of the complete signal controlling apparatus for the purpose of compensating for wind drift as hereinafter described. The base element 20 on which the signal controlling apparatus is mounted is illustrated by Fig. 3a wherein the flange 20' is adapted to be engaged by the clamping means 19 shown in Fig. 3.

The azimuth unit 16 comprises more specifically (Figs. 4 and 5) an elongated channel-shaped member 28' that is open at the lower side thereof except for inwardly turned flanges 29 which retain and guide the block-like slider 14'. The slider 14' is connected to the chart head pin 14 through a ball bearing 30 for preventing excessive friction or binding. As the slider moves along the longitudinal axis of the azimuth unit its instant position represents the distance of the aircraft from the radio station represented by the central axis 17. This distance or range is simulated in the received range signals by electrical means mounted on the lower flanges 29 of the member 28 and cooperating with the slider 14 for controlling signal circuits in a manner presently described.

Specifically, one flange 29 has mounted on its lower side an insulating strip 31 carrying a pair of conducting strips 32 and 33. The strips are connected to conductor terminals 32' and 33' respectively at opposite ends of the azimuth unit and are separated by a gap representing the "cone of silence" at the pivotal center of the unit corresponding to the radio station. The other flange 29 has mounted on its lower side an insulating strip 34 carrying a pair of resistance elements 35 and 36 which also terminate a short distance from the central axis to represent the "cone of silence". The resistance elements, however, are electrically connected to a common conductor terminal at 37 (Fig. 3). The slider 14 has mounted on its lower side a pair of terminal posts 38 and 39 having contacts 40 and 41 for making sliding contact with the opposite conducting strips and resistance elements respectively.

It will be noted that the slider 14 of the azimuth unit is free to move along the entire longitudinal axis of the unit thereby simulating a flight directly over and beyond the radio range station.

Fig. 6 diagrammatically illustrates a complete signal controlling system including the apparatus above described for simulating the radio range A and N quadrant and station identification signals, attenuating said signals in accordance with the simulated position of the aircraft on the radio range, and indicating the attenuated signals in any suitable manner, either aural or visual, by means of a signal receiver circuit. The system comprises essentially a modulator circuit such as an audio frequency oscillator indicated at 42 operating for example at 1020 cycles per second, signal coding circuits generally indicated at 43, light activating means energized from said modulator circuit such as the fast-follow lamps 21 of the unit 15 representing the A and N quadrants, light sensitive means such as the photoelectric cells 22 and 23 arranged to be positioned in light-activated relation to the A and N lamps in accordance with the instant position in azimuth of the simulated flight, and a signal receiver circuit at 44 associated with the photo-electric cells. Accordingly, it will be seen that photoelectric apparatus functions as translating means between the modulator-coding circuits and the signal receiver circuit.

The operation of the system illustrated by Fig. 6 is as follows: the modulator circuit, which includes a direct current source 45 is connected through the coding circuits 43 to the set of fastfollow lamps 21 so that signal impulses corresponding to the A and N and station identification signals are impressed on said lamps. To this end a cam 46 for coding the A and N signals, a cam 47 for transferring the signal circuits to and from the station identification cam and a cam 48 for coding the station identification signals are suitably operated from a common shaft 49 that is connected to a motor (not shown). The transfer cam 47 is rotated at one-twelfth the speed of the other cams to correspond to the time interval between station identification signals. The A and N signals are interlocked as is well known for the purpose of forming the oncourse monotone.

By way of example, let it be assumed that the transfer cam 47 and the associated switch arm 50 are in the neutral position illustrated so that the A and N circuits are in operation and the station identification circuit is idle. The signal circuit is then complete from the modulator circuit at terminal 51 through contacts 52 and 53 to the A and N cam switch arms 54 which alternately engages the A and N circuit contacts 55 and 56. These contacts are connected to the A and N quadrant lamps by conductors 57 and 58 respectively, so that the A and N audio frequency signal impulses are impressed on the lamps. A common lead return 42' connects the lamps to the modulator circuit.

The A and N contacts 55 and 56 are also connected to the transfer contacts 59 and 60 respectively, so that when the transfer cam 47 switches the circuit to the contact arm 61 of the station identification cam, the identification signal circuit will be closed through the switch arm 50 and contact 59 (or 60) for alternately transmitting through the A and N channels. During this operation one A and N circuit, as the case may be, is closed at the contact 52 or 53 and the other is opened by operation of the switch arm 50.

As previously described, the set of photoelectric cells 22 and 23 is rotated about the axis 17 of the radio range unit 15 with change in azimuth so as to receive at different intensities the light rays from the lamps 21. That is, when the cell 22, for example, is directly opposite an A sector lamp the light activation for that cell is a maximum and the light activation from the adjacent N sector is a minimum, i. e. zero. As the cell is rotated toward an N sector lamp, the A light signal gradually diminishes in intensity and after about one-third of the A sector has been traversed the N light signal appears. At the 45° position the A and N light signals from the adjacent sector lamps are equal in intensity and therefore the degree of light activation is equal.

It will be apparent that the rate of change in signal intensity with change in azimuth can be adjusted as desired by proper selection of the light-gathering lenses and by varying the radial distance of the lamps from the photo-electric cells so as to vary the angle of light reception.

The receiver circuit generally indicated at 44 is associated with the photo-electric cells so as first to amplify the attenuated signal impulses impressed on the photo-electric circuits in accordance with varying degrees of light activation of the photo-electric means, and to indicate the signals, such as for example, aurally by means of the earphones 62. Furthermore, the signal surges at the boundaries of the "cone of silence" are faithfully reproduced when the simulated flight passes through the "cone of silence" as hereinafter described.

It shall be understood that visual signal indicating means, such as lamps of any suitable type, may be used if desired, either singly or in combination with the aforesaid aural means.

Referring in particular to Fig. 6, the photoelectric cells 22 and 23 are electrically connected to the opposite terminals of the range unit conductors 32 and 33 respectively, and also through a common terminal at 17' to the grid control circuit of an amplifier including valve 64. The photo-electric energizing circuit is completed through the slider contact 40, D. C. source 73, resistance 74 and conductor 75 to the common conductor 63. The amplifier circuit includes a grid condenser 65 and a grid leak resistance 66 which are connected to the control grid 67 in a well-known manner. The cathode 68 is energized from the secondary circuit of a transformer 69, the primary of which is connected to an alternating current source as indicated. The transformer secondary is provided with a middle tap connected through a resistance to ground to provide a negative bias for grid 67 in a well-known manner. The output circuit of the valve 64 includes the plate 70 that is connected to the primary of the transformer 71, the secondary of which is connected to the earphones 62.

The primary circuit of transformer 69 is controlled by means of the range resistance elements 35 and 36 and a resistance ballast element 72 which is selected so as to have a large positive temperature coefficient and to have slow heating characteristics. An example of such resistance material is tungsten that is suitably insulated to provide thermal lag. During normal operation when the range slider contacts 40 and 41 engage the conducting and resistance elements respectively, the primary current of transformer 69 is varied according to the resistance inserted at 35 or 36. Accordingly, the primary current increases as the contact 41 approaches the center of the range and decreases as it moves away from the center. Near and at the center of the range both the conducting and resistance elements are separated as illustrated so that the contact 40 interrupts the photo-electric circuit and the contact 41 interrupts the primary circuit of transformer 69 to simulate the "cone of silence" where no range signals are heard.

Referring now to Fig. 8 which illustrates graphically the intensity or strength of the signals received in an aircraft as it travels into and through the "cone of silence" in the direction indicated, it will be noted that the intensity is lowered as represented by the curve 76 at the approach side of the axis 17. The curve 77 represents the strong signal surge received when the plane leaves the "cone of silence" traveling away from the station axis. Simulation of this signal reception is provided by the characteristics of the resistance ballast element 72 so that not only are smooth fade-in and fade-out signals obtained at the "cone of silence," but also the stronger surge as the aircraft travels out of the cone. Normally, the resistance element 72 has substantially no effect on the variation in range signals since it functions then only as a substantially constant resistance. When, however, the "cone of silence" is reached the primary circuit of transformer 69 is interrupted and the resistance 72 starts to cool. Assuming that the flight is approximately through the center of the cone, the resistance 72 is cold when the "cone of silence" has been passed so that its resistance is materially less than when the plane entered the cone. Accordingly, when the connection is again made between contact 41 and resistance 35 or 36, the cathode 68 of the amplifier valve receives a larger heating current so that the increased filament emission causes a stronger output signal than when entering the cone. The slow heating characteristic in addition causes the signal strength to taper off in a realistic manner to simulate that of curve 77. The fade-out characteristic when entering the cone is simulated by using the thermal capacity of a valve filament as disclosed in my Patent No. 2,475,314, dated July 5, 1949, for Navigation apparatus for aircraft and training devices.

There is shown in Fig. 7 an alternative form of my invention wherein the positions of the fast-follow lamps 79 and 80 and the photo-electric units 81 are reversed so that the lamps rotate with the azimuth unit to represent change in azimuth and the photo-electric units are stationary and arranged circumferentially about the central axis of range unit 15' to represent the radio range quadrants. Similar reference numbers in Fig. 7 are used to represent similar elements of the drawings. In the system shown by Fig. 7 the modulator circuit including the oscillator 42 and the D. C. source 45 is connected only to the fast-follow lamps 79 and 80 through the range slider contact 40. The photo-electric circuits are interrupted by the coding means as indicated and include the conductors $a$ and $b$ which correspond to conductors 58 and 57 respectively of Fig. 6 for connecting respective pairs of photo-electric units to the coding cams and a common conductor 81' connected to the resistance 74 so that the signal impulses are impressed on the grid control circuit of the amplifier valve 64 generally in the manner previously described.

As in the case of Fig. 6, the primary circuit of transformer 69 is adapted to include the range resistance elements 35 or 36 and the ballast resistance 72 for simulating the range signals, including those at the "cone of silence." One terminal of the A. C. source for the primary is connected by conductor $c$ to the common terminal of the range resistance elements, and the slider contact 41 is series connected by conductor $d$ and ballast resistance 72 to the primary winding. The operation of the system of Fig. 7 is basically the same as Fig. 6 since in both cases the photo-electric means are activated in accordance with the changes in azimuth of the simulated flight.

For the purpose of introducing the effect of wind drift, the radio range unit is adjustable to represent wind direction and the combined range and azimuth units are adapted to be moved at a rate corresponding to wind velocity. The chart tracing at 13 will therefore indicate the ground path of the simulated flight, and the radio range signals will be corrected to correspond to the proper instant position of the aircraft on the range.

To this end, the radio range unit 15 (or 15') is adjustably mounted at 19 (Fig. 3) so that it can be bodily rotated through an angle representing wind drift. An azimuth scale cooperating with a suitable index (not shown) on the unit 15 can be provided on the flange 20' of the range mounting member 20 as shown by Fig. 3a. The wind velocity is represented by sliding movement of the base member 20 (which supports both the range and azimuth units) along the slot 18' (Figs. 1 and 3) in the supporting bracket. This may be done by means of any suitable motive device, such as, for example, the wind drift motor of my Patent 2,366,603. Proper corresponding adjustment of the compass cards and charts to simulate wind drift may be made in the manner described in my aforesaid patent.

For the purpose of simulating actual radio ranges, beam shifting can be used in my invention by simply adjusting the angular positions of the sector units indicated in Figs. 1 and 3. The lamps 21, for example, are adjustably mounted by means of screws 82 in elongated slots 83 in the unit housing. The sector positions can therefore be shifted to correspond with the radio range of any given station by simply positioning the lamps in the slots according to the desired pattern as clearly indicated by Fig. 1.

As previously stated, my invention is not limited to the double-arm azimuth unit 16 and by way of example I have illustrated in Fig. 9 a specific application of my invention including the single-arm azimuth unit of my Patent 2,366,603 to the blue-yellow or B-Y visual-audible radio range system developed by the Civil Aeronautics Authority.

In this system of visual signaling, a radio range is divided into halves, the bisecting line passing through the range station, and the sector on one side is designated blue and the other designated yellow. An aircraft instrument marked accordingly informs the pilot whether he is in the blue or yellow sector. This system can be used in combination with A and N signals in overlapping relation, i. e., both A and N signals appearing in the blue sector, and also in the yellow sector so that the pilot can immediately locate his general position, such as, for example, when he gets the N signal in the blue sector.

Referring specifically to Fig. 9, the range control unit diagrammatically indicated at 84 is in the present instance of the type shown in Fig. 7 wherein two pairs of photo-electric cells 85 and 86 are adjustably disposed circumferentially about the simulated station axis 17 in fixed relation to the rotatable single-arm azimuth unit indicated at 87. The azimuth unit 87 as in the case of Figs. 6 and 7, is provided with a slider 14′, which is operated by the chart head 2 and which controls the sliding contacts 40 and 41 in the manner previously described. The conductors a, b, c and d correspond to similarly designated conductors of Fig. 7 for connecting the device to similar coding and signal controlling circuits. The operation of the single-arm unit 87 through azimuth is fully described in my aforesaid Patent 2,366,603 and need not be described in detail here other than to state that a servomotor swings the unit arm through 180° in case the slider moves into the center of the station on dead-center.

For activating the photo-electric cells in accordance with changes in azimuth of the unit 87, a suitable light source 88 such as a fast-follow lamp of the type above indicated is mounted on the azimuth unit at its pivotal center. The light source is provided with a light shield 88′ that shuts off approximately 180° of the simulated range. For the purpose of producing A and N signals, the photo-electric cells 85 which are positioned in diametrically opposite sectors are connected to the coding cams and amplifier in the manner shown by Fig. 7 by correspondingly marked leads 81′, a and b.

The blue-yellow visual signals are produced by means of the photo-electric cells 86 which are also located in diametrically opposite sectors of the range so as to alternate with the A and N photo-electric cells. The cells 86 are operatively connected to the blue-yellow indicator 89, which may be of the sensitive voltmeter type having a pointer centrally positioned at zero. The terminals of the meter 89 are connected to the opposite terminals of a suitable resistance or impedance 90, which is grounded at its central portion. The resistance terminals are connected through the amplifiers 91 and 92 to the photo-electric cells 86 by conductors 93 and 94 respectively. Accordingly, it will be noted that when one or the other of the photo-electric cells 86 is activated, the resulting amplified current flowing through the corresponding part of the resistance 90 establishes a potential change at the corresponding terminal of the meter 89 so as to swing the pointer to either the blue or yellow sector, as the case may be.

When the azimuth unit is in the position shown, the A signal is a maximum and the light activation of the cells 86 is either zero or very small and equally divided so that the pointer of meter 89 is positioned exactly at the zero midpoint to indicate a simulated position on the dividing line, i. e., the beam between the blue and yellow sectors. This indication together with the comparatively loud A signal orients the pilot with respect to a definite sector of the range.

If, for example, the azimuth unit is rotated clockwise 45° from the position shown, it will be apparent that the A signal will decrease in intensity and the needle at 89 will swing into the yellow sector due to activation of the "yellow" cell 86 and consequent current flow from the amplifier 92 through the right half of the resistance 90.

Summarizing, the forms of my invention shown utilize photo-electric translating means responsive to changes in azimuth of the simulated flight for impressing attenuated range signal impulses on an amplifier circuit to which a signal indicator, such as an aural or visual indicator, is operatively related. My invention can also be used for accurately simulating the surge signals at the "cone of silence." In view of the fact that the photo-electric translating means of my invention inherently operates in a continuously smooth manner, as contrasted with the operation of step-by-step range control apparatus, it will be apparent that I have provided a realistic and comparatively accurate simulation of the radio range signals received in an aircraft in flight on the range, including the area in and about the radio range station itself.

It should be understood that my invention is not limited to specific details of arrangement and construction, and that changes and modifications may occur to one skilled in the art without departing from the spirit of my invention. For example, the photo-electric cells in combination with suitable contact structure on the slider 14 and unit 15 may be obviously used to bring in fan markers, etc., which have a fixed azimuth and range from the station in the manner indicated in my aforesaid Patent 2,366,603.

Also, it should be understood that the slider 14 can be operatively connected to any suitable charting member, such as for example, the "crab" of a well-known ground trainer.

Further, it should be understood that by "A and N type" range signals is meant any suitable arrangement of interlocking signals, such as, for example, the E and T signals used in British radio range systems.

I claim:

1. In training apparatus for simulating radio range signals received in an aircraft maneuvering with respect to a multi-beam radio range station, means for producing and controlling the intensities of a plurality of distinguishing signals in accordance with the simulated flight position comprising photo-electric means, electrical illuminating means for activating said photo-electric means and means adjustable in azimuth rotatable about a fixed axis representing said station for varying said activation in response to change in the simulated instant azimuthal position of said aircraft with respect to said station, means for attenuating the signals in accordance with the simulated radial distance of said aircraft from said station, and receiving means for the signals.

2. In training apparatus for simulating radio range signals received in an aircraft maneuvering with respect to a multi-beam radio range station, means for producing and controlling the intensities of a plurality of distinguishing signals in accordance with the simulated flight position comprising photo-electric means, electrical illuminating means for activating said photo-electric means and means adjustable in azimuth about a fixed axis representing said station in accordance with the simulated instant azimuthal position of said aircraft with respect to said station for causing relative rotation between said photo-electric means and said electrical illuminating means thereby varying said activation to correspond with said instant direction, means for attenuating the signals in accordance with the simulated radial distance of said aircraft from said station, and receiving means for the signals.

3. Signal controlling apparatus for use with a trainer for simulating radio range signals received in an aircraft maneuvering with respect to a radio range station, said trainer having means movable both radially and in azimuth in accordance with the instant simulated position of said aircraft with respect to a simulated radio range station, said apparatus comprising illuminating means and photo-electric means arranged in concentric relation to each other, means operable by and in accordance with the movement of said trainer means in azimuth for causing relative rotation of and varying the activating relation between said illuminating and photo-electric means for producing a plurality of distinguishing signals representing direction, means controlled by and in accordance with radial movement of said trainer means for attenuating said signals in respect to range so as to simulate the signals received from said radio range station for a corresponding simulated instant position of said aircraft, and receiving means for said signals.

4. Signal controlling apparatus for use with a trainer for simulating flight of an aircraft with respect to a radio range station, said trainer having movable means arranged to follow the instant simulated position of said aircraft with respect to a simulated radio range station, comprising illuminating means, photo-electric means positioned concentrically of and for relative rotation with respect to said illuminating means and arranged to be activated thereby, means operatively interconnecting said movable means and said photo-electric means for causing variation in said light activation in accordance with simulated change in azimuth of said aircraft for simulating signals received from said radio range station, and a receiver circuit for said signals.

5. Signal controlling apparatus for use with a trainer for simulating flight of an aircraft with respect to a radio range station, said trainer having movable means representing the instant simulated position of said aircraft with respect to a simulated radio range station, said apparatus comprising illuminating means, photo-electric means positioned substantially concentrically with respect to said illuminating means and arranged to be activated thereby, and means connected to said movable means operable in response to change in the aforesaid instant simulated position of said aircraft for producing curvilinear relative movement between said illuminating means and photo-electric means so as to vary the degree of light activation of said photo-electric means, and a signal receiver circuit associated with said photo-electric means.

6. Signal controlling apparatus for use with a trainer for simulating flight of an aircraft with respect to a radio range station having a plurality of signal transmitting channels, comprising photo-electric means including a set of light-activated units for producing signal current, a set of light activating units, the units of one of said sets being substantially concentrically disposed in relation to the other set and corresponding in number and angular position to the direction sectors of the radio range, the said other set of units being rotatably mounted to represent azimuth of the simulated flight for varying the degree of light reception at the light activated units thereby varying signal current, means for controlling rotation of said other set in accordance with change in azimuth of said simulated flight relative to said radio station, means for also varying signal current in accordance with the radial distance of said simulated flight from said radio station, and a signal receiver circuit related to said light-activated units.

7. Signal controlling apparatus for use with a trainer for simulating flight of an aircraft with respect to a multi-beam radio range station comprising a set of light-activated units, a set of light-activating units, the units of one of said sets being substantially concentrically and radially disposed in relation to the other set about a common center representing the "cone of silence" axis of said station and corresponding in number and angular position to the direction sectors of the radio range, the said other set of units being rotatably mounted at said axis to represent azimuth of said simulated flight, means for controlling the rotation of said other set of units in accordance with simulated change in azimuth position of said aircraft for varying the degree of light activation, and electrical signal receiving means associated with said light-activated units.

8. Signal controlling apparatus for use with a trainer for simulating flight of an aircraft with respect to a radio range station, said trainer having movable means representing the instant simulated position of said aircraft with respect to a simulated radio range station, said apparatus including a modulator circuit and a fast-follow light source energized from said circuit, photo-electric means arranged to be positioned in light-activated concentric relation to said source, means responsive to change in the instant simulated azimuthal position of said aircraft for producing relative movement between said source and photo-electric means for varying the degree of light activation, said movement being about an axis representing said radio station, and a signal receiver circuit associated with said photo-electric units.

9. Signal controlling apparatus for use with a trainer for simulating flight of an aircraft with respect to a radio range station, said trainer having movable means representing the instant simulated position of said aircraft with respect to a simulated multi-beam radio range station, said apparatus comprising an audio frequency modulator circuit and a fast-follow light source energized from said circuit, photo-electric means arranged to be positioned in light-activated concentric relation to said light source, coding means for the station signals, means responsive to change in the instant simulated azimuthal position of said aircraft for producing relative rotative movement between said light source and photo-electric means for varying the degree of light activation so as to control photo-electric signal currents, and a signal receiver circuit associated with said photo-electric means.

10. Signal controlling apparatus for use with a trainer for simulating flight of an aircraft with respect to a radio range station, said trainer having movable means representing the instant simulated position of said aircraft with respect to a simulated radio range station, said apparatus comprising a modulator circuit, a plurality of fast-follow lamps arranged to be energized through said modulator circuit, coding means for impressing signal impulses on the lamp circuits, said lamps being circumferentially disposed about an axis representing said station and corresponding in number to the direction sectors of the radio range, photo-electric units rotatable about said axis with respect to said lamps, means responsive to change in the instant simulated azimuthal position of said aircraft for causing rotation of said units to represent azimuth of the simulated flight from said station thereby varying the degree of light activation of said units, and a signal receiver circuit associated with said photo-electric units for indication of the simulated range signals.

11. Signal controlling apparatus for use with a trainer for simulating flight of an aircraft with respect to a radio range station, said trainer having movable means representing the instant simulated position of said aircraft with respect to a simulated radio range station, said apparatus comprising a modulator circuit, coding means for impressing signal impulses on said circuit, a plurality of fast-follow lamps arranged to be connected through said coding means to said modulator circuit, said lamps being circumferentially disposed about an axis representing said station and corresponding in number and angular position to the direction quadrants of the radio range, photo-electric means positioned at said axis, means responsive to change in the instant simulated azimuthal position of said aircraft for causing rotation of said photo-electric means with respect to said lamps to represent azimuth of the simulated flight from said station for varying the degree of light activation, and a signal receiver circuit associated with said photo-electric means.

12. Signal controlling apparatus for use with a trainer for simulating flight of an aircraft with respect to a multi-beam radio range station, said trainer having movable means representing the instant simulated position of said aircraft with respect to a simulated radio range station, said apparatus comprising an audio frequency modulator circuit, coding means for impressing signal impulses on said circuit, a plurality of fast-follow lamps arranged to be connected through said coding means to said modulator circuit, said lamps being circumferentially disposed about an axis representing said station and corresponding in number and angular relation to the simulated direction sectors of the radio range, an element mounted substantially at its mid-section for rotation about said axis through 360°, a pair of photo-electric units mounted on said element and positioned at opposite sides of said axis, means responsive to change in the instant simulated azimuthal position of said aircraft for causing rotation of said element to represent azimuth of the simulated flight from said station so as to vary the degree of light activation of said unit and thereby vary sector signals, electrical means carried by said element at opposite sides of said axis for also varying the intensity of the sector signals in accordance with the simulated radial distance of said aircraft from said station, said electrical means being arranged to interrupt abruptly the signals at said axis to represent the "cone of silence," and a signal receiver circuit associated with said photo-electric units.

13. Signal controlling apparatus for use with a trainer for simulating flight of an aircraft with respect to a multi-beam radio range station, said trainer having movable structure representing the instant simulated position of said aircraft with respect to a simulated radio range station, said apparatus comprising an audio-frequency modulator circuit, fast-follow lamp means energized from said circuit, a plurality of photo-electric units disposed radially and circumferentially about an axis representing said station so as to correspond to the maximum signal direction of the radio range, said fast-follow lamp means being movable about said axis for varying the degree of light activation of said units in accordance with change in sector position of said flight position by means associated with said structure, coding means, and a signal receiver circuit associated with said photo-electric units.

14. Signal controlling apparatus for use with a trainer for simulating flight of an aircraft with respect to a multi-beam radio range station, said trainer having movable means representing the instant simulated position of said aircraft with respect to a simulated radio range station, said apparatus comprising signal producing means, means controlled by said movable means for varying the intensity of the signals in accordance with change in the simulated radial distance of said aircraft from said station including an impedance arranged to be varied by said movable means, means for abruptly varying said impedance to represent the "cone of silence," a resistance ballast element having a slow heating characteristic and a large positive temperature coefficient associated with said impedance for simulating characteristic fade-out and surge reception of signals at the boundary limits of the "cone of silence," and a thermionic receiver circuit for said signals.

15. Signal controlling apparatus for use with a trainer for simulating flight of an aircraft with respect to a multi-beam radio range station, said trainer having movable means representing the instant simulated position of said aircraft with respect to a simulated radio range station, said apparatus comprising a control unit having a member rotatable to represent azimuth and operatively connected to said movable means, a set of photo-electric units and a set of fast-follow lamps, one of said sets being mounted in said control unit concentrically with respect to the axis of rotation of said member so as to represent the direction sectors of the radio range, said axis representing the radio range station, the other of said sets being carried by said rotatable member so as to vary the degree of light activation in accordance with change in angular position of said member, a pair of impedances positioned on said member at opposite sides of said axis and abruptly varied at said axis to represent the "cone of silence," the aforesaid movable means being arranged to vary said impedances in substantially unbroken continuous movement in accordance with change in the simulated radial distance of the aircraft from said station including simulated flight directly over and past said station, and a signal receiver circuit associated with said set of photo-electric units.

16. Signal controlling apparatus comprising electric illuminating means of the type capable of following frequencies in the audio frequency range, photo-electric means arranged to be activated thereby, said illuminating and photo-electric means being positioned concentrically with respect to a reference axis and arranged for relative rotative movement with respect to each other, signal controlling means operable in accordance with a condition to be indicated for producing said relative rotative movement so as to vary the degree of activation of said photo-electric means, and an aural signal receiver circuit associated with the said photo-electric means.

17. In training apparatus for simulating radio range signals received in an aircraft maneuvering with respect to a radio range station, a light source mounted for rotation about an axis representing the radio range station, a plurality of photo-electric units mounted about said axis and arranged to be in light-activated relation to said source, a visual range sector indicator operatively connected to two of said units, and an aural sector signal receiver circuit operatively connected to other of said photo-electric units.

18. In training apparatus for simulating radio range signals received in an aircraft maneuvering with respect to a radio range station, means including a light source rotatable about an axis representing the radio range station in accordance with changes in azimuth of the flight position from said station, said source having means for shielding in all positions thereof a material sector of the simulated range from said source, a plurality of photo-electric units positioned about said axis and arranged to be in light-activated relation to said source, a visual B-Y type indicator operatively connected to a pair of diametrically disposed units, and an aural signal receiver circuit operatively connected to another pair of diametrically disposed photo-electric units, the photo-electric units associated with said visual indicator and aural receiver being alternately disposed about said axis so that two different aural range signals can appear in one visually indicated sector.

19. In training apparatus for simulating radio range signals received in an aircraft maneuvering with respect to a radio range station, electric illuminating means of the fast-follow type mounted for rotation about an axis representing the radio range station, a plurality of photo-electric units mounted circumferentially about said axis and arranged to be in light-activated relation to said illuminating means, a visual indicator of the B-Y type operatively connected to diametrically positioned units for representing opposing sectors of the range, and an aural signal receiver circuit operatively connected to other diametrically positioned photo-electric units for representing range signals.

20. In training apparatus for simulating radio range signals received in an aircraft maneuvering with respect to a multi-beam radio range station, signal apparatus comprising electric illuminating means of the type capable of following frequencies in the audio frequency range, an audio frequency generator for energizing said means, photo-electric means, said illuminating and photo-electric means being radially spaced and positioned concentrically with respect to a reference axis representing said radio station so that one of said means is substantially at said axis and the other of said means is circumferentially disposed about said axis to represent sectors of the radio range, said illuminating and photo-electric means arranged for relative rotative movement with respect to each other, signal controlling means operable in accordance with change in the azimuthal position of the simulated flight for producing said relative rotative movement so as to vary the degree of light activation of said photo-electric means, a signal coding device connected in circuit with one of said means, and an aural signal receiver circuit associated with the said photo-electric means.

RICHARD C. DEHMEL.

REFERENCES CITED

The following references are of record in the file of this patent:

UNITED STATES PATENTS

| Number | Name | Date |
|---|---|---|
| 1,731,127 | Diehl | Oct. 8, 1929 |
| 1,911,986 | Bischoff | May 30, 1933 |
| 2,080,511 | Sjostrand | May 18, 1937 |
| 2,191,730 | Sjostrand | Feb. 27, 1940 |
| 2,206,036 | Herson | July 2, 1940 |
| 2,209,158 | Goldsmith | July 23, 1940 |
| 2,243,600 | Hulst | May 27, 1941 |
| 2,277,502 | Padva | Mar. 24, 1942 |
| 2,346,693 | Lyman | Apr. 18, 1944 |
| 2,352,216 | Melvin | June 27, 1944 |
| 2,358,793 | Crane | Sept. 26, 1944 |
| 2,366,603 | Dehmel | Jan. 2, 1945 |
| 2,389,359 | Grow | Nov. 20, 1945 |
| 2,403,387 | McLennan | July 2, 1946 |
| 2,429,597 | Andrews | Oct. 28, 1947 |
| 2,438,126 | Muller | Mar. 23, 1948 |
| 2,448,544 | Muller | Sept. 7, 1948 |
| 2,452,038 | Crane | Oct. 26, 1948 |
| 2,475,314 | Dehmel | July 5, 1949 |